(12) United States Patent
Kowles

(10) Patent No.: US 9,443,553 B2
(45) Date of Patent: *Sep. 13, 2016

(54) STORAGE SYSTEM WITH MULTIPLE MEDIA SCRATCH PADS

(71) Applicant: Seagate Technology LLC, Cupertino, CA (US)

(72) Inventor: Andrew M. Kowles, Lyons, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 39 days.

This patent is subject to a terminal disclaimer.

(21) Appl. No.: 14/263,008

(22) Filed: Apr. 28, 2014

(65) Prior Publication Data

US 2015/0310892 A1 Oct. 29, 2015

(51) Int. Cl.
*G11B 20/12* (2006.01)
*G11B 5/09* (2006.01)
*G11B 20/10* (2006.01)
*G06F 3/06* (2006.01)

(52) U.S. Cl.
CPC .............. *G11B 20/1217* (2013.01); *G11B 5/09* (2013.01); *G11B 20/10527* (2013.01); *G06F 3/0601* (2013.01)

(58) Field of Classification Search
CPC .............. G11B 5/09; G11B 20/10527; G11B 20/1217; G06F 11/1441; G06F 12/0866; G06F 3/0601
USPC ...................................... 360/55, 15; 711/113
See application file for complete search history.

(56) References Cited

U.S. PATENT DOCUMENTS

| | | | |
|---|---|---|---|
| 5,500,776 A | 3/1996 | Smith | |
| 6,378,037 B1 | 4/2002 | Hall | |
| 7,315,916 B2 | 1/2008 | Bennett et al. | |
| 7,386,655 B2* | 6/2008 | Gorobets et al. ............. | 711/103 |
| 7,941,585 B2 | 5/2011 | Asher et al. | |
| 8,947,817 B1* | 2/2015 | Chung et al. ................... | 360/55 |
| 2004/0003172 A1 | 1/2004 | Su et al. | |
| 2004/0088479 A1 | 5/2004 | Hall | |
| 2007/0019315 A1 | 1/2007 | Tamura et al. | |
| 2012/0300326 A1 | 11/2012 | Hall | |
| 2013/0212350 A1 | 8/2013 | Gaster et al. | |
| 2014/0098438 A1 | 4/2014 | Poudyal | |
| 2014/0254042 A1* | 9/2014 | Yeo et al. ........................ | 360/48 |
| 2014/0281185 A1* | 9/2014 | Edgar et al. ................... | 711/104 |
| 2014/0281194 A1* | 9/2014 | Gaertner et al. .............. | 711/105 |
| 2015/0169460 A1* | 6/2015 | Zaw et al. .......... | G06F 12/0866 |

* cited by examiner

*Primary Examiner* — Ali Neyzari
(74) *Attorney, Agent, or Firm* — HolzerIPLaw, PC

(57) ABSTRACT

A system or a device having a storage area with a plurality of circumferential tracks around a central axis, the tracks for storing data therein. The system or device includes at least two media scratch pads in the storage area, located at different radii from the central axis. In some implementations, the storage area has multiple discs.

20 Claims, 5 Drawing Sheets

STORAGE SYSTEM WITH MULTIPLE MEDIA SCRATCH PADS

BACKGROUND

Shingled magnetic recording allows for increased areal density, but certain implementations entail band update in-place when one or more blocks within the band require modification. As a back-up during the in-place band update, the data is protected by a second, temporary, memory (e.g., a scratch pad).

SUMMARY

In one implementation, this disclosure provides a system with a storage area having a plurality data tracks, the tracks for storing data therein. At least two media scratch pads are in the storage area, located at different locations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
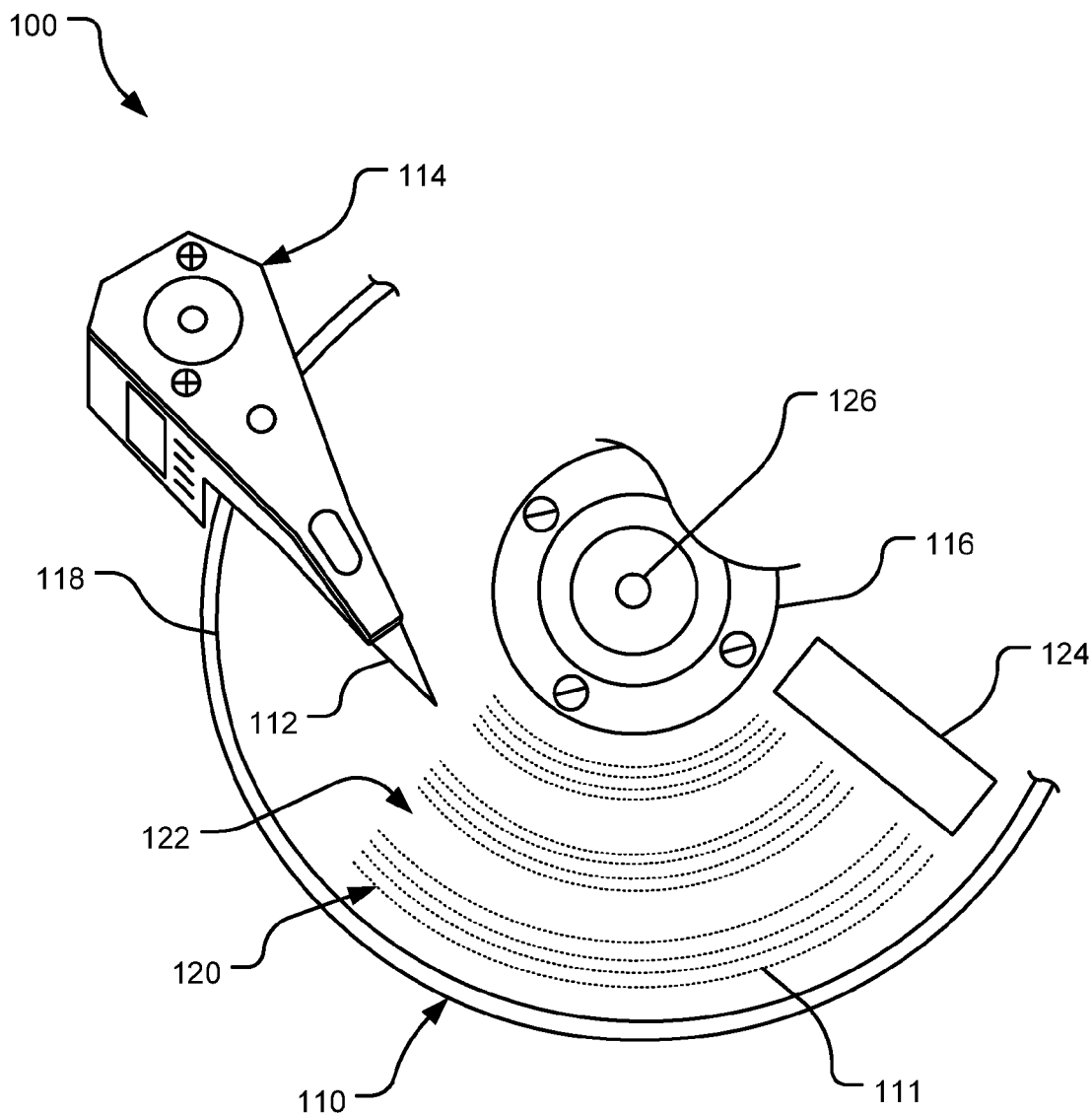
FIG. 1 is a partial perspective view of an example data storage device.

The present disclosure is directed to data storage systems that include a plurality of data storage areas or locations. Some implementations of the data storage systems use one or more of such plurality of data storage areas or locations for temporary storage of data. Such temporary nonvolatile storage areas may be referred to as media scratch pads. A storage controller of such data storage systems including media scratch pads may use the media scratch pads to store data received from a host, data read from other areas of the storage device, etc. Alternatively, the systems may also use the media scratch pad as a back-up storage area. For example, in case of a rude (sudden or unexpected) power loss, data being read from, or written to, parts of storage media may be stored to a media scratch pad.

More particularly, the present disclosure is directed to data storage systems and devices that include at least two media scratch pads that are distributed across the storage media. The disclosure is also directed to data storage systems and devices that have a storage media and a storage controller configured to designate a plurality of non-continuous storage areas on the storage media as media scratch pads.

If a media scratch pad is allocated to only one of the plurality of data storage locations or surfaces, increased or amplified component (e.g., media and read/write head) wear-and-tear is experienced. On the other hand, when multiple media scratch pads are present in different locations, the wear-and-tear is distributed across multiple components, extending their life. Additionally, with multiple media scratch pads, the average seek distance and time to a media scratch pad can be reduced.

The technology disclosed herein can be used with various data storage devices. Examples of such data storage devices include hard disc drives, solid state hybrid drives, solid state media such as NAND, NVRAM, Resistive RAM (ReRAM), Magnetic RAM (MRAM), Phase Change Memory (PCM), and other memory technologies.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

Referring to FIG. 1, a top perspective view of a portion of a disc drive or data storage device 100 is shown. The data storage device includes a magnetic storage media such as disc 110 having a plurality of concentric, generally circular data tracks 111 thereon. While FIG. 1 shows the use of one magnetic recording disc 110, other numbers of discs (such as two discs, four discs, six discs, ten discs, etc.) and other types of storage media (such as optical media, solid state, etc.) can alternatively be utilized as desired for device 100.

Data on disc 110 is accessed by a corresponding data transducer that is supported by a head gimbal assembly (HGA) 112 supported at the distal end of a rigid actuator arm or assembly 114. Controlled operation of actuator arm 114 causes the transducer of HGA 112 to align with tracks 111 defined on the disc surfaces to store data thereto or retrieve data therefrom.

Tracks 111 are located between an innermost track at the inner diameter (ID) 116 and an outermost track at outer diameter (OD) 118 of disc 110. In the particular implementation illustrated, tracks 111 are arranged in bands 120 (e.g., groups of logical sectors) with an isolation region or guard track 122 between adjacent bands 120. Guard tracks 122 are, for example, allocated statically to a set range of logical block addresses (LBAs) on the disc. Disc 110 also includes a data scratch pad (e.g., a temporary memory) 124 for temporarily storing data, as described further below.

Magnetic media storage drives, such as that of FIG. 1, store data in polarized cells on one or more magnetized media, such as disc 110, within each storage drive. Disc 110 has polarized cells arranged in concentric, generally circular data tracks 111. In operation, disc 110 rotates at a constant speed about a spindle 126 while information is written to and read from tracks 111 on disc 110 using the transducer of HGA 112, which includes a read pole or head and a write pole or head (not seen in FIG. 1). The write pole generates a magnetic field that writes data to a disc by changing the magnetic polarization of the cells on the disc that rotates beneath the head. The read pole reads data from the disc by detecting the magnetic polarization of the cells on the disc.

In non-shingled magnetic media, each of the cells on a magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data from being overwritten during a write operation is shingled magnetic recording (SMR).

SMR utilizes a large strong write field generated by the write pole, and the relative ease of detection of polarized cells compared with the polarization process itself. One constraint of shingled magnetic recording is that when data is written to the magnetic media, it is written in sequentially increasing or decreasing radius tracks. The strong write field from the wide writer affects one or more adjacent tracks including the track being written to and one or more previously-written tracks. By design in SMR systems, the write width is larger than the track pitch. As a result, in order to change any data cell within a shingled track, all of the shingled data is re-written in the selected forward shingled sequential write order.

In order to achieve the increased cell density made possible by SMR while compensating for a lack of random write functionality in such a system, one or more isolation regions, also referred to as guard tracks, may be created within with shingled data; FIG. 1 shows examples of guard tracks 122. The guard tracks are one or more adjacent tracks within the shingled data that are unavailable for data recording. In operation, guard tracks 122 define separate data bands 120 of shingled data. Each guard track 122 may be wide enough to prevent any overwriting across the guard track. As a result, guard tracks 122 create bands 120 of shingled data that are isolated from other bands 120. Consequently, a single band 120 of shingled data is rewritten (rather than all of the shingled data on the disc) when one or more cells within band 120 are changed.

When device 100 receives a write command from the host to write new data to disc 110, or when device 100 internally initiates a modify command to modify some existing data on disc 110, device 100 responds to the write and/or modify command(s) by reading and copying all of the data in the data band where the new material is to be written, e.g., data band 120, to media scratch pad 124. After data band 120 is copied to media scratch pad 124, the data is modified in media scratch pad 124 with the new data and the modified data is read back from media scratch pad 124 and re-written to data band 120, thus incorporating the new data associated with the write and/or the modify command.

In some implementations, a single scratch pad 124 is allocated to a set location on disc 110 in a range of physical block addresses (PBAs). In such an implementation, various write or modify operations, directed to any sectors of disc 110 or other discs that may be present in device 100, use media scratch pad 124. As a result, a large number of read and write operations are performed on media scratch pad 124, resulting in extensive wear-and-tear on that location. For example, media scratch pad 124 may result in more bad sectors in the storage area that is allocated to media scratch pad 124. As another example, persistent bad sectors in media scratch pad 124 may cause a permanent degradation of performance for that media scratch pad. Such increase in the bad sectors results in longer access times for reading from and writing data to media scratch pad 124. Furthermore, as all such media scratch pad 124 operations are limited to only disc 110, the transducer on HGA 112 that writes and reads from disc 110 is also used extensively, resulting in higher wear-and-tear on that transducer. A worn transducer can also induce bad sectors, newly unreadable, not only in media scratch pad 124 but also throughout disc 110.

Thus, the present disclosure is directed to devices and systems having a plurality of scratch pads distributed across the data storage surface, in some implementations across multiple discs 110. With multiple media scratch pads 124 in device 100, the wear-and-tear is distributed among the multiple scratch pads 124. Additionally, having multiple scratch pads 124 reduces the wear-and-tear on arm assembly 114 by reducing the amount of travel to the multiple scratch pads 124 compared to travel to a single scratch pad 124. Additionally, if the multiple locations for media scratch pad 124 are distributed across multiple storages discs 110, the wear-and-tear on the transducer of HGA 112 is likewise distributed, extending the life of the transducer and the read/write heads.

Figure 2:
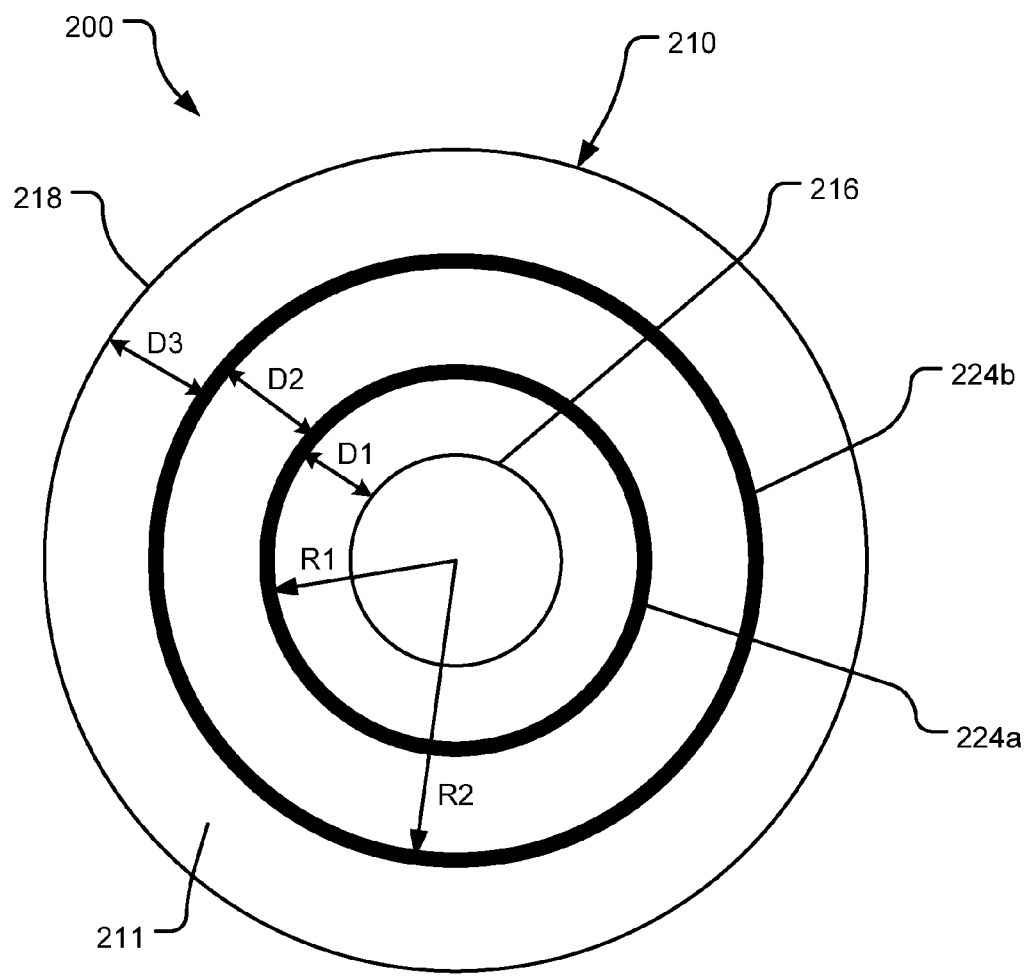
FIG. 2 is a schematic top view of an example disc of a data storage device.

As indicated above, device 100 of FIG. 1 may have a single surface, a single disc, or a plurality of discs on which is a data storage surface. FIG. 2 illustrates a portion of a data storage device 200 having a disc 210 with a first or top surface 211 and a second or bottom surface (not seen in this figure), the terms "top" and "bottom" being used to identify the surfaces as seen in this figure, as the position of disc 210 could be altered, thus changing the orientation of the surfaces. In this implementation, disc 210 has a plurality of (specifically, two) media scratch pads on surface 211. Other implementations have additional media scratch pads on surface 211.

Surface 211 is a data storage surface, having a plurality of concentric circumferential tracks (not shown) present between inner diameter (ID) 216 and outer diameter (OD) 218. Also present is a first media scratch pad 224a and a second media scratch pad 224b, media scratch pads 224 being unconnected, non-contiguous and distributed across surface 211. Although media scratch pad 224 is shown as a full circumferential track on surface 211, in other implementations media scratch pad 224 occupies less than a full circumferential track. First media scratch pad 224a is located at a radius R1 from a rotation axis of disc 210, and second media scratch pad 224b is located at a radius R2 from the rotation axis different than radius R1. The distance between ID 216 and first media scratch pad 224a is identified as distance D1, the distance between first media scratch pad 224a and second media scratch pad 224b is identified as distance D2, and the distance between second media scratch pad 224b and OD 218 is identified as distance D3. In some implementations, media scratch pads 224 are evenly distributed across the data storage surface, so in these implementations, D1, D2 and D3 are or are essentially the same; that is $D1 \approx D2 \approx D3$.

In such a configuration, by having a plurality of media scratch pads 224 on a surface, the wear-and-tear on each scratch pad 224 is reduced. Additionally, having a plurality of media scratch pads 224 on surface 211 decreases the average seek distance (and thus time) for the arm assembly (e.g., arm assembly 114 of FIG. 1) to find a scratch pad. In general, "N" scratch pads on a surface lowers the average seek distance to $1/(2*N)$ of the seek distance if only one scratch pad were present on the surface. Not only is the seek distance and time reduced, because the arm assembly has less distance to travel, the wear-and-tear on the arm assembly is also reduced.

In use, when a band update is required for a particular surface in a particular area, the closest media scratch pad 224 on that surface, e.g., surface 211, is utilized. For example, when a band update on a track closer to ID 216 is required, media scratch pad 224a is used, whereas when a band update to a track closer to OD 218 is required, media scratch pad 224b is used. As the distance to media scratch pads 224a, 224b from a band is reduced, the seek time to such media scratch pad is also reduced, resulting in more reliable storage of data in case of rude (sudden or unexpected) power loss for the storage device.

Figure 3:
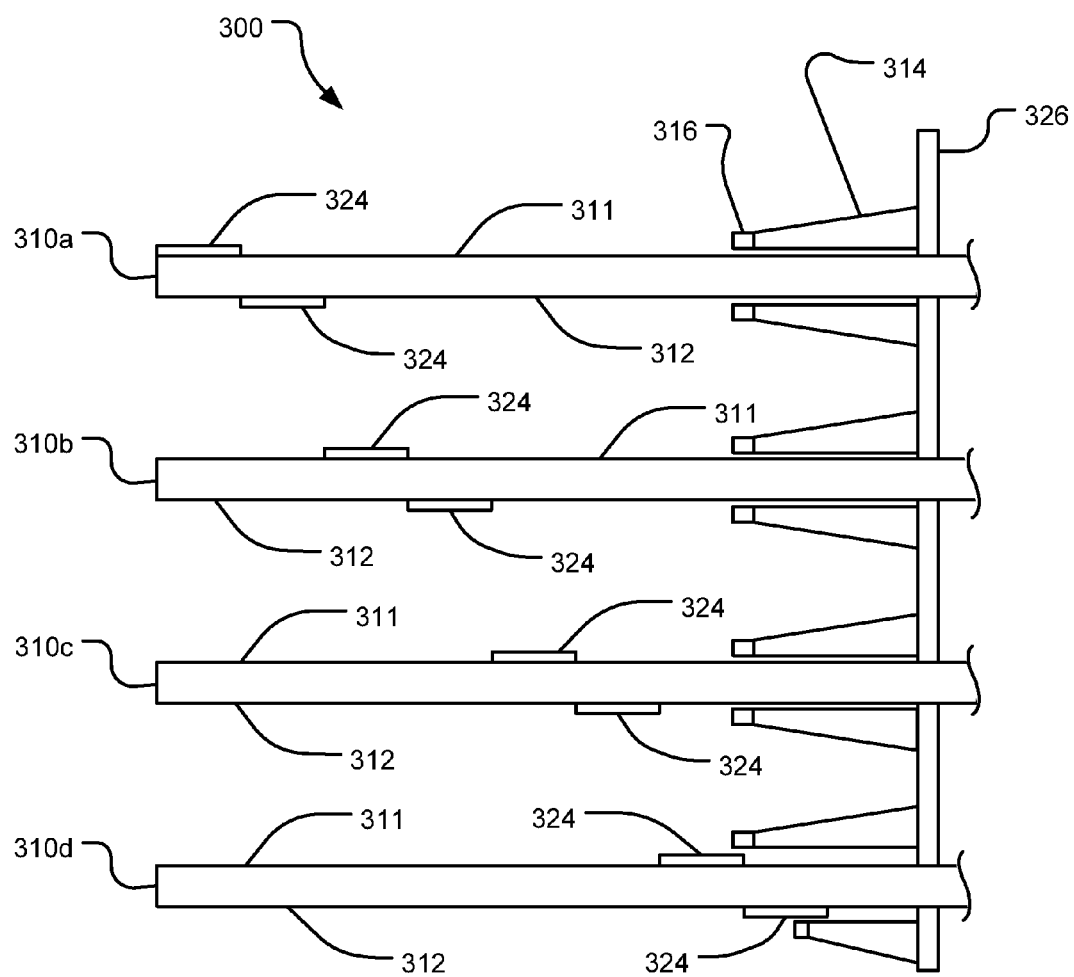
FIG. 3 is a schematic cross-sectional view of an example of multiple discs of a data storage device.

FIG. 3 illustrates a portion of a data storage device 300 having a plurality of discs, particularly, discs 310a, 310b, 310c, 310d, each with a first or top surface 311 and a second or bottom surface 312, the terms "top" and "bottom" being used to identify the surfaces as seen in this figure, as the position of device 300 and discs 310 could be altered, thus changing the orientation of the surfaces. Each of surfaces 311, 312 is a data storage surface accessed by an arm assembly 314 that supports a read/write transducer 316 (assembly 314 and transducer 316 only being identified for disc 310a). Each surface 311, 312 has a media scratch pad, resulting in a plurality of scratch pads in device 300.

Similar to the implementation of FIG. 2, these media scratch pads 324 are distributed across the data storage surface at different radii from a rotation axis 326 of discs 310. In the implementation illustrated in FIG. 3, each media scratch pad 324 is located on an individual surface, either surface 311 or surface 312, a different distance from rotation axis 326; that is, each media scratch pad 324 is alone on a surface 311 or surface 312 and is a different radius from axis 326.

In such a configuration, having a plurality of media scratch pads 324 on a plurality of surfaces, the wear-and-tear on each scratch pad 324 is reduced. In order to theoretically obtain even wear across all scratch pads 324, each surface 311, 312 has one scratch pad 324. Although even wear across all scratch pads 324 may not always occur, because read/writing larger amounts of data to one scratch pad 324 compared to another will result in more wear on one scratch pad than the other, over time, however, the wear should even out across all scratch pads 324.

In addition to reducing the wear on each scratch pad 324, having a plurality of media scratch pads 324 in device 300 at different locations in the storage media decreases the average seek distance (and thus time) for the arm assembly (e.g., arm assembly 314) to find a media scratch pad. In general, "N" media scratch pads in the device lowers the average seek distance to 1/(2*N) of the seek distance if only one media scratch pad were present before. Additionally, each read/write transducer 316 is used less, only when the media scratch pad on its data surface is used, thus reducing wear on read/write transducer 316.

In use, when a band update is required for a particular data storage surface, e.g., surface 311 on disc 310a, the media scratch pad 324 on that surface 311 is utilized.

For the subsequent band update, it is desired to know the location of the previous media scratch pad, especially if the drive were to unexpectedly lose power (often referred to as a rude power down). In one implementation, the location of the last media scratch pad is recorded in the drive, for example, to a nonvolatile memory. This memory can be in the system area of the drive, where a media cache metadata table (MCMT) is stored. The MCMT contains all information about the data in a media cache, such as the host logical block address, the length of the data and where it is in the media cache, details about the user data contained the whole media cache area, and/or metadata head of the media cache segment that was written last time.

When a drive powers up, the "restore" algorithm visits all media scratch pads, in turn, during powering-on of the device. Because it may not be known if the power loss was deliberate or an unexpectedly lost power (such as after an abrupt or rude power loss), the algorithm is designed to visit all the media scratch pads for all power-on-rest (POR) events. For each media scratch pad, the metadata header is examined and the indicated location is visited and tested for errors, or may simply be rewritten without a read test for errors. Each location is visited and the same process is undertaken; no location has the same location in the metadata header. Because the multiple media scratch pads are static in location, their location is known and thus no searching for the locations, which is undesirable, is needed. After all the media scratch pads have been visited and their contents "restored", the algorithm is complete. In the case of a read error of one or more of the media scratch pads, in some implementations it is assumed that power was lost during the writing process to the media scratch pad, thus no restore operation is necessary. Any media scratch pads with read errors are simply rewritten during the normal course of things.

Figure 4:
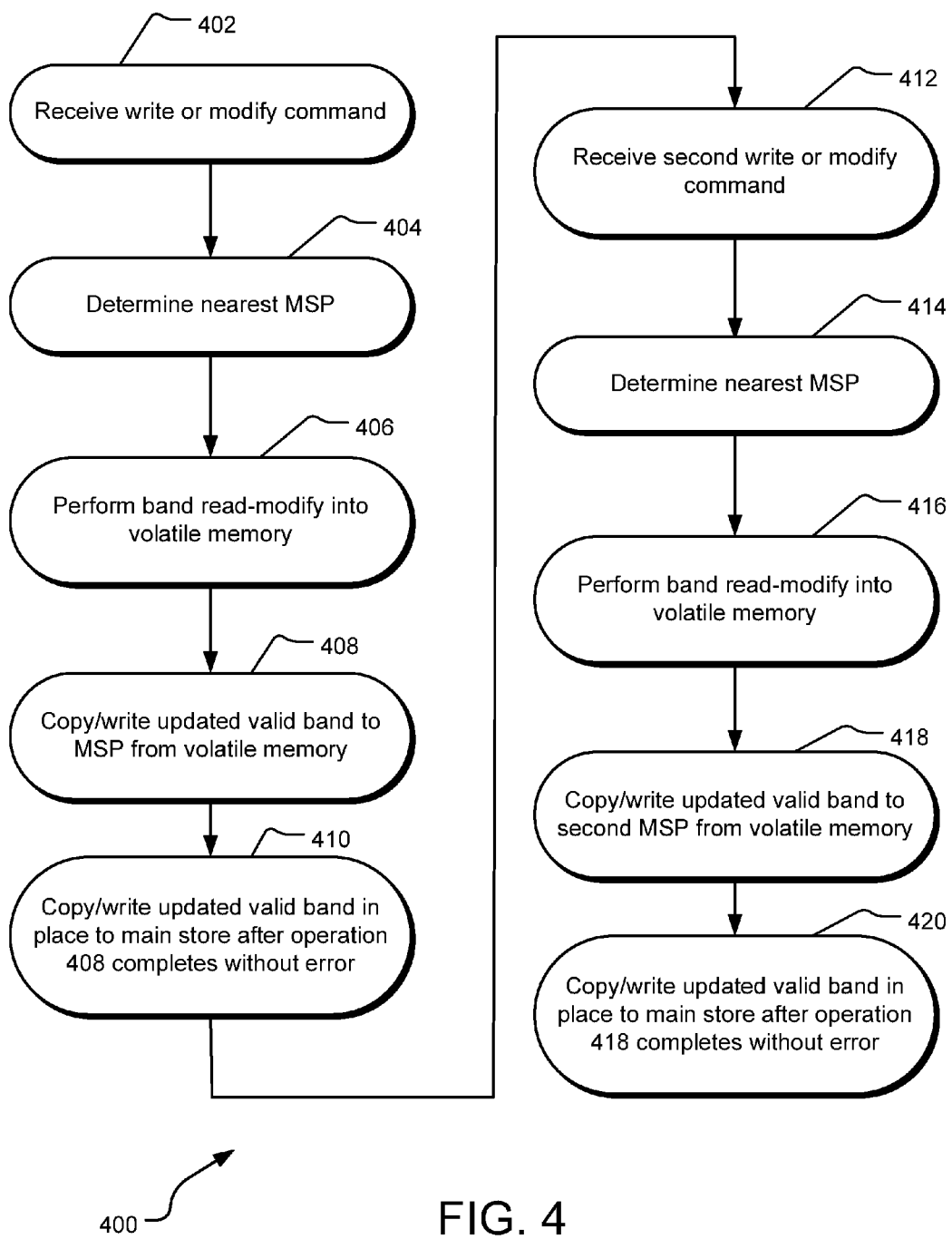
FIG. 4 is a block diagram of an example use case from a system having a plurality of distributed media scratch pads.

FIG. 4 illustrates an example method 400 used by a system or device having a storage media having a plurality of media scratch pads, method 400 directed to using a first media scratch pad (MSP) for write or modify command and subsequently using a second MSP for a subsequent write or modify command. In operation 402, the device (e.g., device 100 of FIG. 1) receives a write or modify command for a data band. From this command, in operation 404, the device finds the nearest MSP, and reads the data from the band, modifies the data, and then writes the modified band data into volatile memory in operation 406. In operation 408, the updated band data in the volatile memory is copied and written to the MSP, and in operation 410, the modified band data is copied and written to a 'main store', after the previous operation has completed without error. Subsequently, the device receives a second write or modify command for a data band in operation 412, this data band being the same or different than the previous data band. The device then finds the nearest MSP in operation 414 for that data band, and reads the data from the band, modifies the data, and then writes the modified band data into volatile memory in operation 416. In operation 418, the updated band data in the volatile memory is copied and written to the second MSP, and in operation 420, the modified band data is copied and written to the 'main store', after the previous operation has completed without error.

Figure 5:
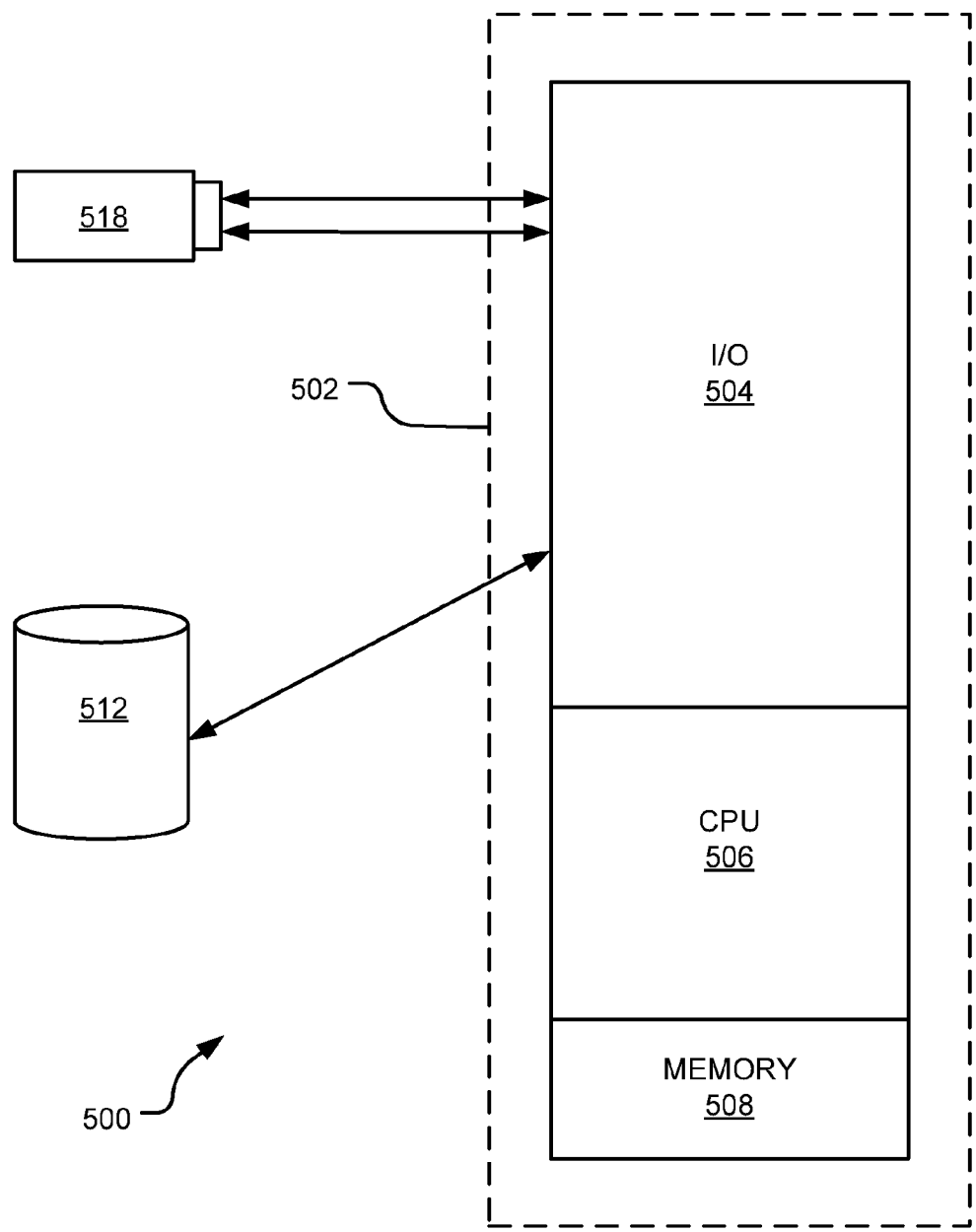
FIG. 5 is a block diagram of an example computer system suitable for implementing the rotating scratch pad on a magnetic media disc.

FIG. 5 discloses a block diagram of a computer system 500 suitable for implementing the rotating scratch pad of this disclosure on a magnetic media disc.

Computer system 500 is capable of executing a computer program product embodied in a tangible computer-readable storage medium to execute a computer process. The tangible computer-readable storage medium is not embodied in a carrier-wave or other signal. Data and program files may be input to computer system 500, which reads the files and executes the programs therein using one or more processors. Some of the elements of a computer system are shown in FIG. 5, where a processor 502 is shown having an input/output (I/O) section 504, a Central Processing Unit (CPU) 506, and a memory section 508. There may be one or more processors 502, such that processor 502 of system 500 has a single central-processing unit 506 or a plurality of processing units 506. System 500 further includes a controller, not shown in FIG. 5, configured to designate a plurality of non-contiguous storage areas on the storage media as media scratch pads; the controller may be software, firmware, or a combination thereof. System 500 may be a conventional computer, a distributed computer, or any other type of computer. The described technology is optionally implemented in software loaded in memory 508, a disc storage unit 512, or removable memory 518.

In an example implementation, the selection of the media scratch pad may be embodied by instructions stored in memory 508 and/or storage unit 512 and executed by processor 506. Further, local computing system, remote data sources and/or services, and other associated logic represent firmware, hardware, and/or software which may be configured to adaptively distribute workload tasks to improve system performance. The use of the media scratch pad may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 508 and/or storage unit 512 and executed by processor 502.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A shingled media recording system comprising:
   a storage area having a plurality of shingled tracks for storing data therein, and
   at least two media scratch pads, the at least two media scratch pads located at different locations on the storage area.

2. The system of claim 1, wherein the at least two media scratch pads are located on a single surface of a disc located at different radii from a central axis.

3. The system of claim 1 comprising a disc having a first surface and a second surface opposite the first surface, one of the at least two media scratch pads located on the first surface and a second of the at least two media scratch pads located on the second surface.

4. The system of claim 1 comprising at least two discs, the at least two media scratch pads located on the at least two discs at different radii from a central axis, wherein the tracks are circumferential tracks around the central axis.

5. The system of claim 4 comprising two discs each having a first surface and a second surface opposite the first surface, and four media scratch pads, one media scratch pad located on each of the first surfaces and on the second surfaces.

6. The system of claim 1, wherein the at least two media scratch pads each comprises a fully circumferential track around a central axis.

7. The system of claim 1, wherein the at least two media scratch pads each comprises a partial circumferential track around a central axis.

8. A shingled media recording system comprising:
   a storage media having a band having a plurality of shingled tracks; and
   a storage controller configured to designate a plurality of non-contiguous storage areas on the storage media as media scratch pads.

9. The system of claim 8, wherein the plurality of media scratch pads are located at different distances from an axis of the storage media.

10. The system of claim 9, wherein the plurality of media scratch pads are distributed evenly from the axis of the storage media.

11. The system of claim 9, wherein the storage media is a disc and the axis is a central rotation axis of the disc.

12. The system of claim 8, wherein the storage media comprises a plurality of discs, and each of the plurality of discs has a media scratch pad thereon.

13. The system of claim 12, wherein each of the plurality of media scratch pads is located at a different radius from a central rotation axis of the plurality of discs.

14. The system of claim 8, wherein the media scratch pads are fully circumferential scratch pads.

15. The system of claim 8, wherein the storage controller is further configured to select one of the plurality of media scratch pads for a band update operation based on distance between the selected media scratch pad and location of a band where the band update operation is required.

16. A method comprising:
   designating a plurality of non-contiguous storage areas on a shingled storage media as media scratch pads;
   writing data from the shingled storage media to at least one of the media scratch pads; and
   writing data from the media scratch pads back to the shingled storage media.

17. The method of claim 16, wherein the non-contiguous storage areas are on a surface of a disc.

18. The method of claim 16, wherein the non-contiguous storage areas are on opposite sides of a disc.

19. The method of claim 16, wherein the non-contiguous storage areas are on a plurality of discs.

20. The method of claim 16, wherein the non-contiguous storage areas are on a same surface of a disc and at different radii from a central axis of the disc.

* * * * *